United States Patent
Kim et al.

(10) Patent No.: US 8,363,294 B2
(45) Date of Patent: Jan. 29, 2013

(54) IMAGE PROCESSING APPARATUS AND METHOD OF CONTROLLING THE SAME

(75) Inventors: Young Mi Kim, Seoul (KR); Jong Hyon Yi, Yongin-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 472 days.

(21) Appl. No.: 12/642,358

(22) Filed: Dec. 18, 2009

(65) Prior Publication Data

US 2010/0157396 A1 Jun. 24, 2010

(30) Foreign Application Priority Data

Dec. 24, 2008 (KR) ........................ 10-2008-0133175

(51) Int. Cl.
 *H04N 1/46* (2006.01)
(52) U.S. Cl. ....... 358/525; 358/505; 358/1.16; 358/494; 358/487; 358/3.27; 358/474; 358/513; 358/514; 358/515
(58) Field of Classification Search .................. None
 See application file for complete search history.

(56) References Cited

U.S. PATENT DOCUMENTS

| | | | | | |
|---|---|---|---|---|---|
| 4,663,655 | A | * | 5/1987 | Freeman | 348/242 |
| 7,280,709 | B2 | * | 10/2007 | Minami et al. | 382/300 |
| 7,449,666 | B2 | * | 11/2008 | Kaihotsu | 250/205 |
| 7,529,003 | B2 | * | 5/2009 | Fukawa | 358/505 |
| 7,535,606 | B1 | * | 5/2009 | Walton et al. | 358/509 |
| 7,551,327 | B2 | * | 6/2009 | Chang et al. | 358/471 |
| 7,595,918 | B2 | * | 9/2009 | Amimoto et al. | 358/487 |
| 7,884,978 | B2 | * | 2/2011 | Ikeno et al. | 358/509 |
| 8,118,217 | B1 | * | 2/2012 | Ma et al. | 235/379 |
| 2003/0202225 | A1 | * | 10/2003 | Fukawa et al. | 358/506 |
| 2004/0130553 | A1 | * | 7/2004 | Ushida et al. | 345/531 |
| 2004/0130750 | A1 | * | 7/2004 | Ushida et al. | 358/1.16 |
| 2006/0256120 | A1 | * | 11/2006 | Ushida et al. | 345/531 |
| 2008/0204823 | A1 | * | 8/2008 | Wang | 358/494 |
| 2009/0161138 | A1 | * | 6/2009 | Nakamura et al. | 358/1.13 |
| 2009/0161139 | A1 | * | 6/2009 | Kagawa et al. | 358/1.13 |
| 2009/0161182 | A1 | * | 6/2009 | Yamada et al. | 358/505 |

FOREIGN PATENT DOCUMENTS

KR   10-2007-0001189   1/2007

OTHER PUBLICATIONS

English language abstract of KR 10-2007-0001189, published Jan. 3, 2009.

* cited by examiner

*Primary Examiner* — King Poon
*Assistant Examiner* — Ted Barnes
(74) *Attorney, Agent, or Firm* — Staas & Halsey LLP (57) ABSTRACT

Disclosed is an image processing apparatus and a method of controlling the same. A color contact image sensor (CIS) module employing a single channel line sensor can be used to produce substantially the same performance as a color CIS module employing a three-channel line sensor and having color filters to, for example, reduce manufacturing costs. Moreover, a blurring phenomenon that can occur in a scanned image can be reduced and the quality of the scanned image can be improved.

3 Claims, 11 Drawing Sheets

IMAGE PROCESSING APPARATUS AND METHOD OF CONTROLLING THE SAME

CROSS-REFERENCE TO RELATED APPLICATION

This application claims the benefit of Korean Patent Application No. 2008-00133175, filed on Dec. 24, 2008 in the Korean Intellectual Property Office, the disclosure of which is incorporated herein by reference in its entirety.

TECHNICAL FIELD

Embodiments of the present disclosure generally relate to an image processing apparatus, and more particularly, to an image processing apparatus with a contact image sensor (CIS) module employing a single channel line sensor having a multi-color light source that can reduce a color shift of an image signal read by the CIS module, and to a method of controlling the same.

BACKGROUND OF RELATED ART

In an image processing apparatus, such as a scanner or a copier, for example, a contact image sensor (CIS) module can be used. A CIS module is an image sensor module configured to optically read image information of an original document and to convert the optically read image information into an electrical signal.

The CIS module can include a light source having elements configured to emit light with wavelengths associated with three different colors: red (R), green (G), and blue (B). The R, G, and B colors are often referred to collectively as RGB. The CIS module can include a light guide configured to guide light from the light source to be incident an original document across its width direction and a sensor array configured to detect the light reflected from the document. The sensor array can include multiple sensor integrated circuits (ICs) to perform a photoelectric conversion of the reflected light. The sensor ICs in the sensor array can be linearly arranged to have a length that generally correspond to the width of the document being read, that is, the sensor array can correspond to a line of the image of the original document.

The light source can be arranged to face the light incident surface of the light guide so that the light radiated by the light source can be incident on the surface of the light guide. The light can be guided to form a line along the main scanning direction of the original document such that the original document, which can be placed on a support such as a glass support, can be substantially uniformly illuminated in a linear shape along the main scanning direction. Red, green and blue light emitting diodes (LEDs) can be used as the light emitting elements of the light source. The light emitting elements can be sequentially driven in a time division manner. The light radiated by the light source and reflected from the original document can be focused by a lens array to form an image on the sensor array. A color image signal, which includes R, G and B color information, can be produced by the sensor array, and can be externally output through an electrical connector, for example.

When the RGB LEDs are sequentially turned on during one period, the reading of the RGB color image associated with one line can be completed.

To obtain two-dimensional information of the original document, the document and the CIS module can be moved relative to each other in the sub scanning direction at a predetermined speed. Because the radiation locations of the RGB light on the document in the sub scanning direction can be different, the timing associated with the reading of the RGB information can be different. Accordingly, when the RGB outputs are synthesized to form color image information, a color shifts can occurs in the sub scanning direction. That is, when the original document is read using the CIS module that used a single channel line sensor having a time division multi-color light source, in order to implement the colors, each of the RGB LEDs may be sequentially turned on during 1/3 of an exposure time of one line to scan the colors. Thus, because a registration error of a 1/3 pixel can occur between R-G and G-B, a color shift can occur. For example, an upper portion of an image can appear reddish, a lower portion of the image can appear bluish, and/or fringes can result in the upper and/or lower portions of the image.

Conventional attempts heretofore to reduce the color shift of the image includes the use of a CIS module employing a three-channel line sensor, and/or the provision of color filters corresponding to the various colors.

SUMMARY OF THE DISCLOSURE

In accordance with one aspect of the present disclosure, an image processing apparatus may be provided to comprise a sensor module, a memory and a processor. The sensor module may have a light source and an optical sensor. The light source may be configured to generate a plurality of lights each of a color different than, and being temporally offset from, other ones of the plurality of lights. The optical sensor may be a single channel line sensor, and may be configured to produce color signals associated with the plurality of lights reflected from a document. The memory may be configured to store data associated with the color signals produced by the optical sensor. The data associated with the color signals may be stored in units of lines. The processor may be configured to determine interpolation ratios of the color signals associated with a current line of data stored in the memory based on a reference color and based on at least one other line of data stored in the memory, and may be configured to generate a new color signal associated with the current line based on the determined interpolation ratios.

The plurality of colors may include three colors. The image processor may interpolates the color signals associated with each of the three colors based on the reference color.

The three colors may include red (R), green (G) and blue (B).

The reference color may be any one of R, G and B.

The reference color may for example be green. The image processor may determine the interpolation ratios by the equation: $R(i)'=2/3 \times R(i)+1/3 \times R(i+1)$, $G(i)'=G(i)$, and $B(i)'$ $1/3 \times B(i-1)+2/3 \times B(i)$. The index i may be the current line index value.

The reference color may alternatively be red, for example. The image processor may determine the interpolation ratios by the equation: $R(i)'=R(i)$, $G(i)'=2/3 \times G(i)+1/3 \times G(i-1)$, and $B(i)'=1/3 \times B(i)+2/3 \times B(i-1)$. The index i may be the current line index value.

With the reference color being green, for example, the image processor determines the interpolation ratios by the equation: $R(i)'=1/6 \times R(i-1)+5/6 \times R(i)$, $G(i)'=1/2 \times G(i-1)+1/2 \times G(i)$, and $B(i)'=5/6 \times (Bi-1)+1/6 \times B(i)$. The index i may be the current line index value.

The image processor may alternatively determine the interpolation ratios by the equation: $R(i)'=3/10 \times R(i-1)+7/10 \times R(i)$, $G(i)'=1/6 \times G(i-1)+4/6 \times G(i)+1/6 \times G(i+1)$, and $B(i)'=7/10 \times B(i)+3/10 \times B(i+1)$. The index i may be the current line index value.

According to another aspect of the present disclosure, a method of controlling an image processing apparatus may be provided. The image processing apparatus may include a sensor module having a single channel line sensor and a light source configured to produce a plurality of temporally offset lights of different colors. The method may comprise the steps of: scanning a document with the sensor module to produce color signals associated with the scanned document; storing data associated with the color signals; determining interpolation ratios for color signals associated with a current line of stored data based on a reference color and based on color signals associated with at least one other line of stored data; and generating new color signals associated with the current line based on the determined interpolation ratios.

The plurality of lights may include a light for each of red (R) color, green (G) color and blue (B) color. Any one of the R color, the G color and the B color may be the reference color on which the determined interpolation ratios are based.

The interpolation ratios may be determined by the equation: $R(i)'=R(i)$, $G(i)'=2/3 \times G(i)+1/3 \times G(i-1)$, and $B(i)'=1/3 \times B(i)+2/3 \times B(i-1)$. The index i may be the current line index value.

The interpolation ratios may alternatively be determined by the equation: $R(i)'=1/6 \times R(i-1)+5/6 \times R(i)$, $G(i)'=1/2 \times G(i-1)+1/2 \times G(i)$, and $(i)'=5/6 \times (Bi-1)+1/6 \times B(i)$. The index i may be the current line index value.

The interpolation ratios may alternatively be determined by the equation: $R(i)'=3/10 \times R(i-1)+7/10 \times R(i)$, $G(i)'=1/6 \times G(i-1)+4/6 \times G(i)+1/6 \times G(i+1)$, and $B(i)'=7/10 \times Bi+3/10 \times B(i+1)$. The index i may be the current line index value.

According to yet another aspect of the present disclosure, an apparatus for acquiring an image from a document may be provided. The acquisition of the image may be realized by exposing the document sequentially with at least a first light of a first color and a second light of second color different from the first color, and by receiving at a single channel line sensor the first and second lights reflected off the document with a temporal offset therebetween. The single channel line sensor may have an array of optical sensors arranged in a line along a main scanning direction, which optical sensors may be configured to output color signals in response to receipt of each of the reflected first and second lights. The apparatus may comprise a memory and a processor. The memory may be configured to store data associated with lines of color signals produced by the optical sensors. Each line of color signals representing color signals contemporaneously output by the optical sensors. The processor may be configured to determine new color signals associated with a current line of at least one color associated with the at least first and second lights based on a reference color and based on the data associated with the current line and at least one other line of color signals. The new color signals may compensate for the temporal offset between the at least first and second lights.

The apparatus may further comprise a second processor that may be configured to receive the color signals output by the optical sensors and to convert the received color signals into data for storage in the memory.

BRIEF DESCRIPTION OF THE DRAWINGS

Various aspects of the disclosure will become apparent and more readily appreciated from the following description of the embodiments, taken in conjunction with the accompanying drawings, in which.

DETAILED DESCRIPTION OF SEVERAL EMBODIMENTS

Reference will now be made in detail to several embodiments, examples of which are illustrated in the accompanying drawings, wherein like reference numerals refer to like elements throughout. While the embodiments are described with detailed construction and elements to assist in a comprehensive understanding of the various applications and advantages of the embodiments, it should be apparent however that the embodiments can be carried out without those specifically detailed particulars. Also, well-known functions or constructions will not be described in detail so as to avoid obscuring the description with unnecessary detail. It should be also noted that in the drawings, the dimensions of the features are not intended to be to true scale and may be exaggerated for the sake of allowing greater understanding.

Figure 1:
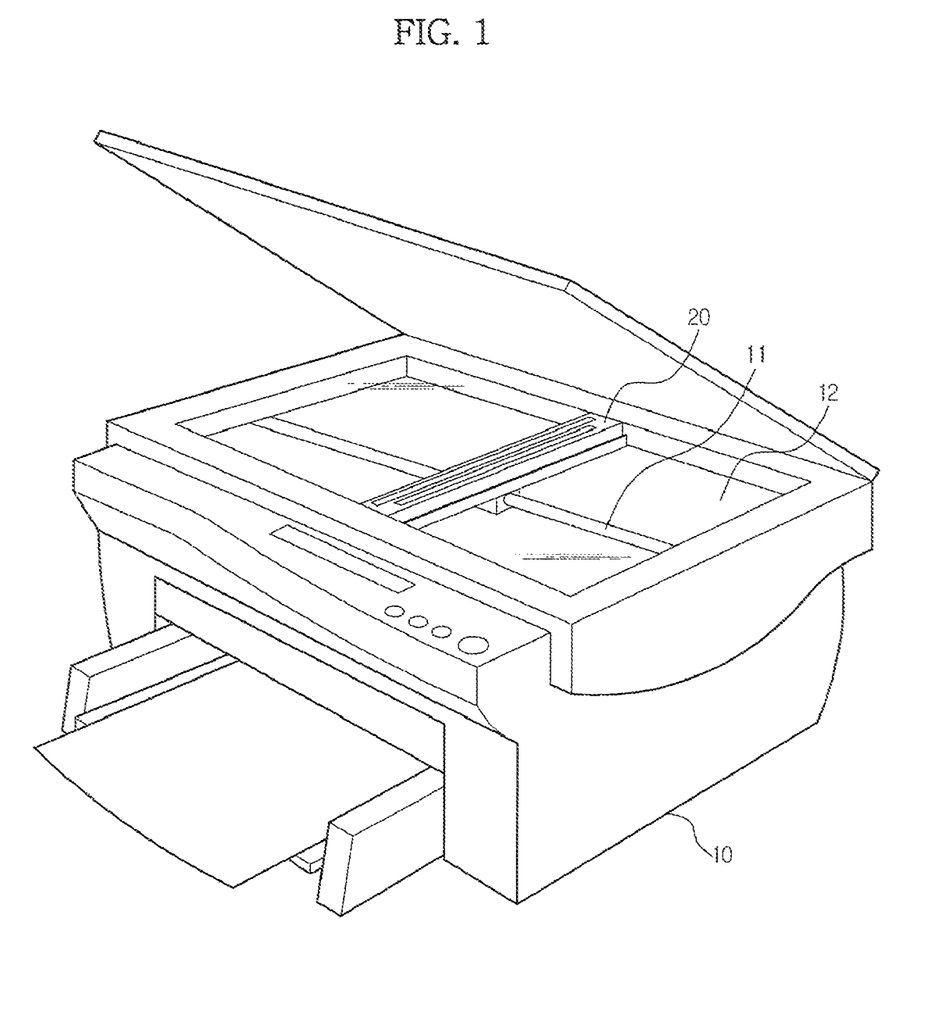
FIG. 1 is a perspective view of an image processing apparatus according to an embodiment of the present disclosure.

FIG. 1 is a perspective view of an image processing apparatus according to an embodiment of the present, disclosure. As shown in FIG. 1, the image processing apparatus can include a contact image sensor (CIS) module 20 mounted on the upper portion of a main body 10. The CIS module 20 can be configured to read an original document laid or placed on a glass 12 and to generate an image signal of that document, while reciprocally moving along a guide member 11.

Figure 2:
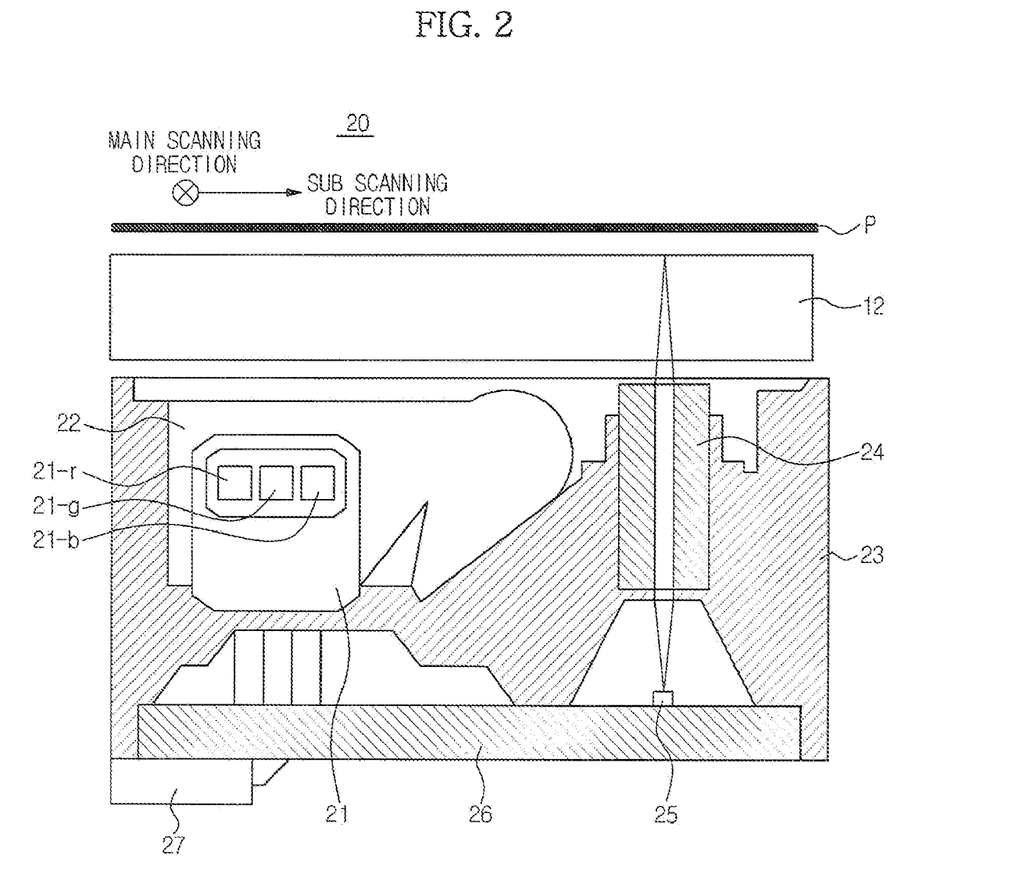
FIG. 2 is a cross-sectional view of a Contact Image Sensor (CIS) module according to an embodiment of the present disclosure usable in an image processing apparatus.

FIG. 2 is a cross-sectional view of the CIS module 20 according to an embodiment of the present disclosure. As shown in FIG. 2, the CIS module 20 can include multiple light sources 21, each of which can be configured to produce light of a different color, a light guide 22 configured to guide light from the light sources 21 along the width direction of an original document P and a sensor array 25 configured to detect light reflected from the document.

The light sources 21 can be configured to radiate light to the original document P, and can include emission elements 21-r, 21-g, and 21-b, which produce light having wavelengths associated with primary colors red (R), green (G) and blue (B), respectively. The light radiated by the light sources 21 can be incident on the light guide 22, which is arranged along the width direction of the original document P, such that the light is guided in the main scanning direction as indicated in FIG. 2. The light can be radiated from a light emitting portion of the light guide 22 at a linear light velocity. Thus, the light can be substantially uniform when radiated along the width direction of the original document P placed on the glass 12. The light produced by the light sources 21 and reflected from the original document P can be focused on the sensor array 25 disposed on a substrate 26 by a lens array 24. The sensor array 25 can generate an electrical signal corresponding to an image received through the lens array 24. Such electrical signal can be externally provided as an output of the sensor array 25 through a connector 27 coupled to the sensor array 25. A frame 23 can be configured to hold the light guide 22, the lens array 24 and the substrate; 26 at their respective predetermined positions.

Figure 3:
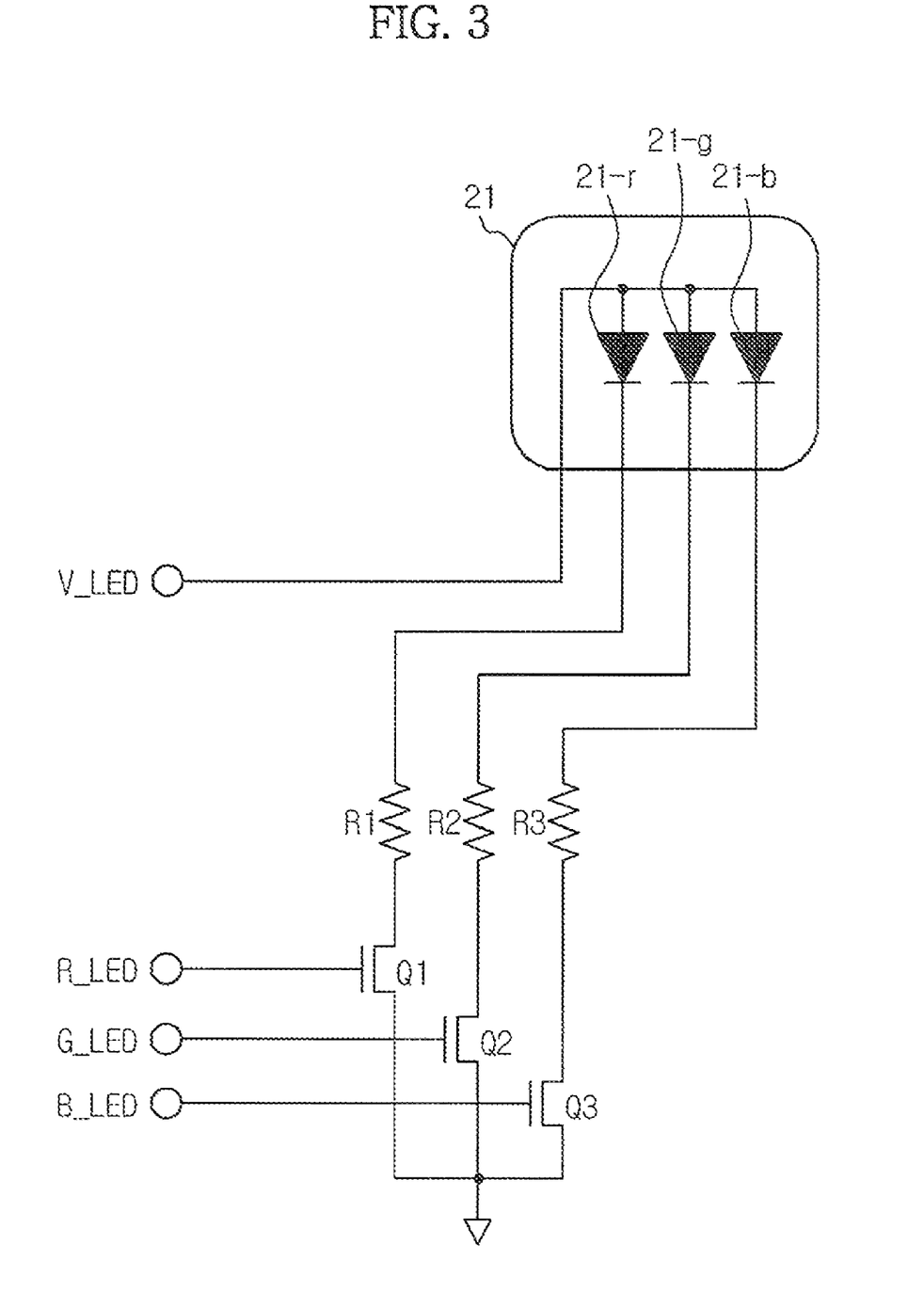
FIG. 3 is a circuit diagram of a light source of the CIS module according to an embodiment of the present disclosure.

As shown in FIG. 3, light emitting diodes (LEDs) configured to emit red (R) light, green (G) light and blue (B) light using a common anode can be used as the light emitting, elements 21-r, 21-g and 21-b, respectively, of the light sources 21. A signal V_LED can be applied to the common anode of the LEDs. The cathodes of the LEDs 21-r, 21-g and 21-b can be connected to the switching elements Q1, Q2 and Q3 through resistors r1, r2, and r3, and can be turned on, that is, can be driven sufficiently to produce light, by driving signals R_LED, G_LED and B_LED, respectively.

Figure 4:
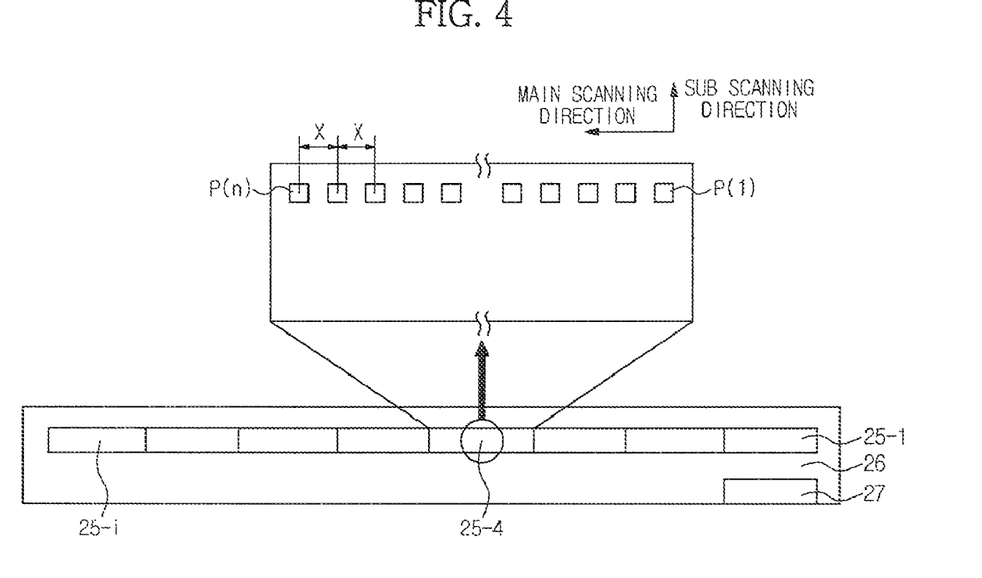
FIG. 4 is a diagram of a sensor array of the CIS module according to an embodiment of the present disclosure.

FIG. 4 is a diagram of a sensor array of the CIS module according to an embodiment of the present disclosure. FIG. 4 shows an enlarged diagram of an arrangement of a sensor integrated circuit (IC) that forms the sensor array. As shown in FIG. 4, the sensor array 25 can include several chips. For example, the sensor array 25 can include multiple sensor ICs, from sensor IC 25-1 to sensor IC 25-i, each of which can be configured to perform photoelectric conversion. The sensor ICs in the sensor array 25 can be linearly arranged along the main scanning direction. Each of the sensor ICs of the sensor array 25 can include n number of pixels, from P(1) to P(n), for example. The pixels in the sensor IC can be configured to perform photoelectric conversion, and can be linearly arranged along the main scanning direction at a predetermined spacing interval x. The expanded view of sensor IC 25-4 is by way of example to illustrate the configuration of the pixels in a sensor IC of the sensor array 25.

Figure 5:
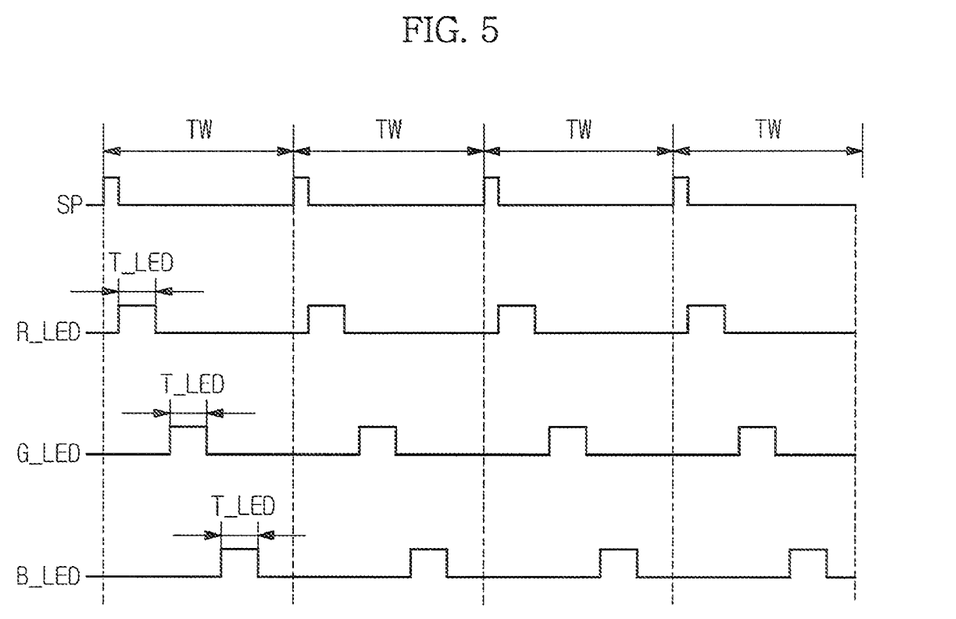
FIG. 5 is a timing diagram showing sequential turning on of RGB Light Emitting Diodes (LEDs) within one period of a synchronization pulse SP in the CIS module according to an embodiment of the present disclosure.

FIG. 5 is a timing diagram showing the sequential turning-on of the LEDs that produce R, G and B light within one period (TW) of a synchronization pulse (SP) in the CIS module 20 according to an embodiment of the present disclosure. As shown in FIG. 5, any one of the three LEDs described above with respect to FIG. 3 can be controlled within the period of the synchronization pulse. In this example, T_LED refers to a turning-on time associated each LED during one period of the synchronization signal. In this example, when the driving signals R_LED, G_LED and B_LED are sequentially applied within one period TW, the turning-on period of each of the light emitting elements 21-r, 21-g and 21-b can be substantially equal to ⅓ of the period TW (i.e., TW/3) with the timing of light emission between the light emitting elements being temporally offset from one another.

Figure 6:
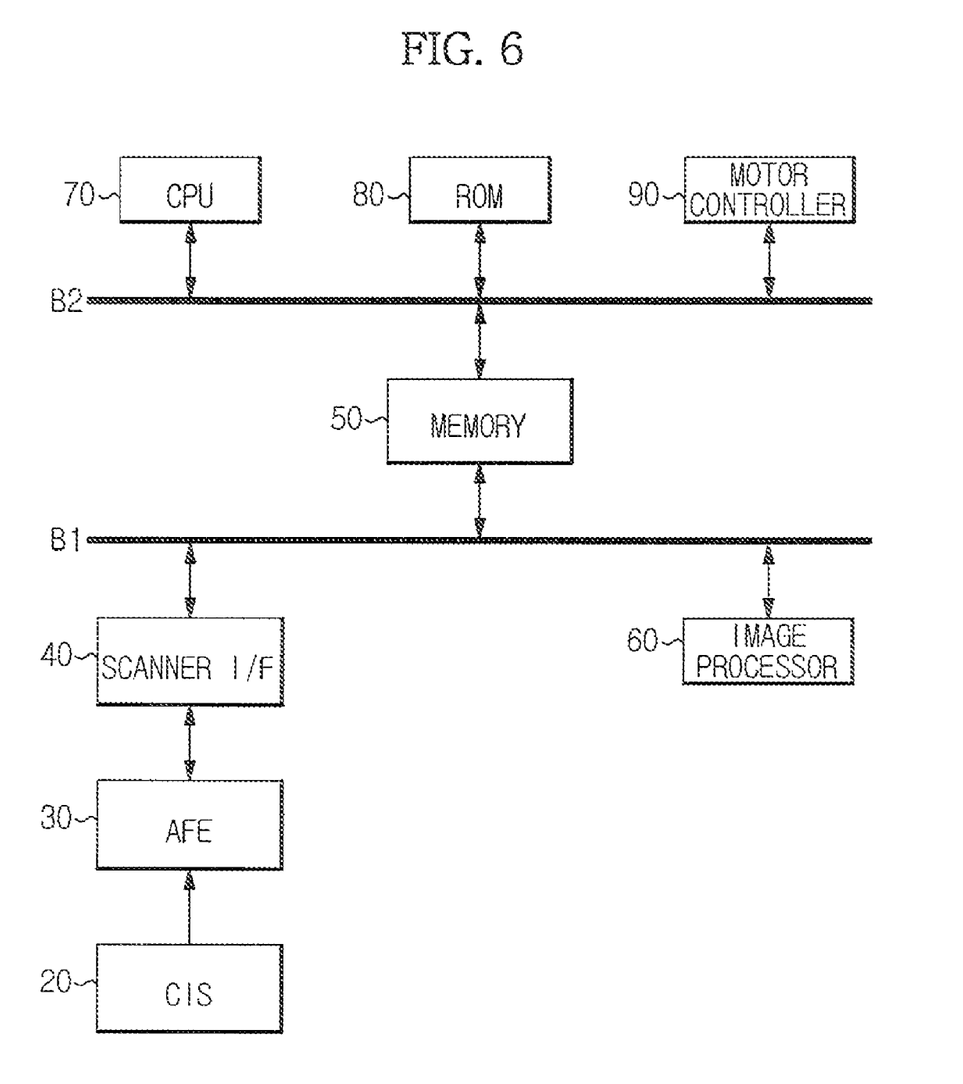
FIG. 6 is a block diagram of the image processing apparatus according to an embodiment of the present disclosure.

FIG. 6 is a block diagram of the image processing apparatus according to an embodiment of the present disclosure. As shown in FIG. 6, the image processing apparatus can include an analog front end (AFE) 30, a scanner interface (I/F) 40, a memory 50, an image processor 60, a central processing unit (CPU) 70, a read only memory (ROM) 80 and a motor controller 90. Each of the AFE 30, the I/F 40, the memory 50, the image processor 60, the CPU 70, the ROM 80, and the motor controller 90 can include hardware (e.g., analog circuitry, digital circuitry, memory, processor, central processing unit, input/output interfaces), or software (e.g., operating system, firmware, embedded code, applications), or both, and in some embodiments may be implemented as one or more devices that combine some of the functions thereof.

The CIS module 20 can be configured to produced light with the light sources 21 and to receive the light reflected from the original document P, and may be configured to convert the received light into an electrical signal. In this embodiment, the electrical signal can be an analog signal, for example.

The AFE 30 can be configured to convert the analog signal obtained from scanning the image by the CIS module 20 into a digital signal. In some embodiments, the output from the CIS module 20 can be a digital, signal. In such embodiments, the AFE 30 need not be used.

The scanner I/F 40 can be connected to the CIS module 20 through the AFE 30. The scanner I/F 40 can be configured to receive and/or processes the image signal output from the CIS module 20. The image signal received and/or processed by the scanner I/F can be stored in the memory 50.

The image processor 60 can be configured to perform image processing operations, such as interpolation, for example, with respect to the image signal that had been processed and/or stored in the memory 50 by the scanner I/F 40.

The CPU 70 can be configured to control the various data processing operations associated with the components shown in FIG. 6. The CPU 70 can be configured to control various operations of the image processing apparatus. For example, the CPU 70 can be programmed to control the operations of some or all of the electrical components of the image processing apparatus.

The ROM 80 can be configured to store computer instructions for an operating or application program(s) that can be executed by the CPU 70 to process data and/or to control the components of the image processing apparatus.

The motor controller 90 can be configured to control the driving of a motor to move the CIS module 20 in the sub scanning direction such that the CIS module 20 scans the original document in units of lines along the main scanning direction.

The scanner I/F 40, the image processor 60 and the memory 50 can be connected via a first bus B1. The CPU 80, the ROM 90, the motor controller 90 and the memory 50 can be connected via a second bus B2. The use of the first bus B1 and the second bus B2 are non-limiting examples of electrical connections by which the electric signals may be transmitted between the above-described components.

Figure 7:
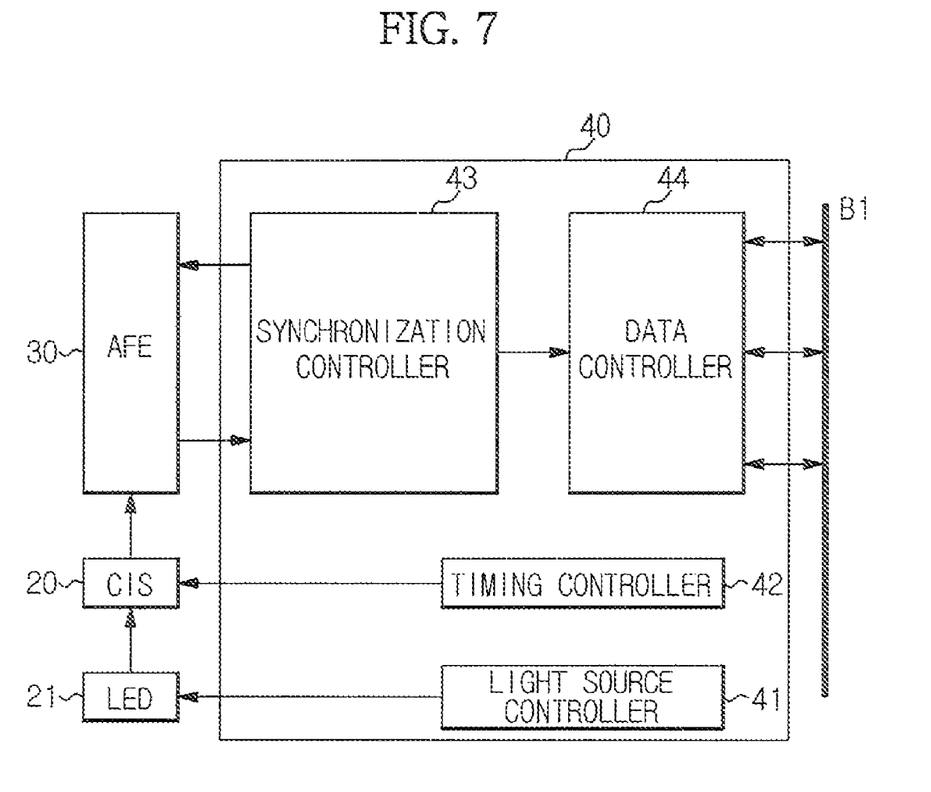
FIG. 7 is a block diagram of a scanner interface (I/F) of the image processing apparatus according to an embodiment of the present disclosure.

FIG. 7 is a block diagram of the scanner I/F 40 of an image processing apparatus according to an embodiment of the present disclosure. As shown in FIG. 7, the scanner I/F 40 can include a light source controller 41, a timing controller 42, a synchronization controller 43, and a data controller 44. As described above with respect to the scanner I/F 40, each of the light source controller 41, the timing controller 42, the synchronization controller 43, and the data controller 44 can include hardware, or software, or both.

The light source controller 41 can be configured to control the turning ON and OFF of the light sources 21 (which may include, e.g., R, G, and B LEDs) of the CIS module 20. The light source controller 41 can be configured to control the synchronization pulse SP and the driving signals R_LED, G_LED and B_LED to control the sequential turn-on of the LEDs corresponding to the color elements of RGB. The timing control provided by the light source controller 41 can be performed in accordance with the synchronization pulse, from the timing controller 42.

The timing controller 42 can be configured to generate a control signal for controlling the CIS module 20 according to a reading speed and to output the control signal to the CIS module 20.

The output signal from the CIS module 20 can be provided as an input to the AFE 30. The AFE 30 can perform, for example, a signal gain adjustment and/or an analog-to-digital (A/D) conversion of the signal received from the CIS module 20 to convert the analog signal output from the CIS module 20 into a digital signal that can be provided to the scanner I/F 40.

The synchronization controller 43 can be configured to set a predetermined threshold level corresponding to the analog signal of the CIS module 20 with respect to the AFE 30. In addition, the synchronization controller 43 can be configured to generate and output a synchronization clock to control the sampling of the analog signal such that the AFE 30 can produce a digital signal. Moreover, the synchronization controller 43 can be configured to receive the image signal from the AFE 30.

The data controller 44 can be configured to receive the image signal from the AFE 30 through the synchronization controller 43 and to store the image signal in the memory 50 via the first bus B1.

Figure 8:
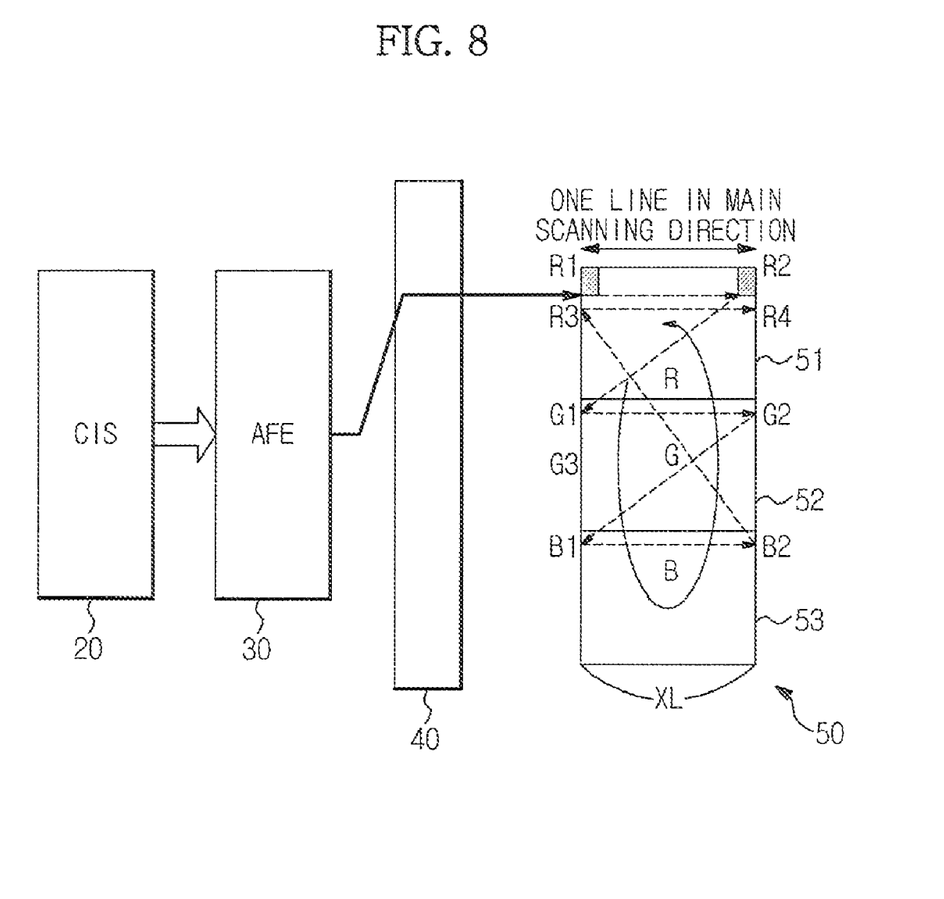
FIG. 8 is a diagram describing a process of dividing color image data into RGB data of a single channel and of storing the RGB data in a memory of the image processing apparatus according to an embodiment of the present disclosure.

FIG. 8 is a diagram describing a process of dividing color image data of a single channel into RGB data and of storing the RGB data in the memory of the image processing apparatus, according to an embodiment of the present disclosure. As shown in FIG. 8, when the RGB data corresponding to a first line in the main scanning direction is output in series, the R data can be stored in an R region 51 of the memory 50, the G data can be stored in a G region 52 of the memory 50, and the B data can be stored in a B region 53 of the memory 50. In this example, the R data corresponding to a first line R1 to R2 in the main scanning direction of the RGB data can be stored in the R region 51 of the memory 50 according to the line sequence.

The G data corresponding to a first line G1 to G2 in the main scanning direction of the RGB data can be stored in the G region 52 of the memory 50 according to the line sequence.

The B data corresponding to a first line B1 to B2 in the main scanning direction can be stored in the B region 53 of the memory 50 according to the line sequence.

Once the RGB data corresponding to the first line is stored, R data corresponding to a second line R3 to R4 in the main scanning direction of the RGB data can be stored in the R region 51 of the memory 50. The same approach can be subsequently followed with respect to G data and B data, and for the remaining lines of data.

Although, in the above-described embodiment, the RGB data is stored in the memory 50 in the line sequence by dividing the memory 50 into R data, G data, and B data regions, the data can be sequentially stored in a same region of the memory 50.

In an embodiment of the present disclosure, the image processor 60 can be configured to interpolate the remaining colors based on a reference color with respect to the color-based image signals stored in the memory 50 to, for example, lighten color fringes that may occur in the upper and lower portions of the image, thereby reducing the color shift of the image.

Figure 9:
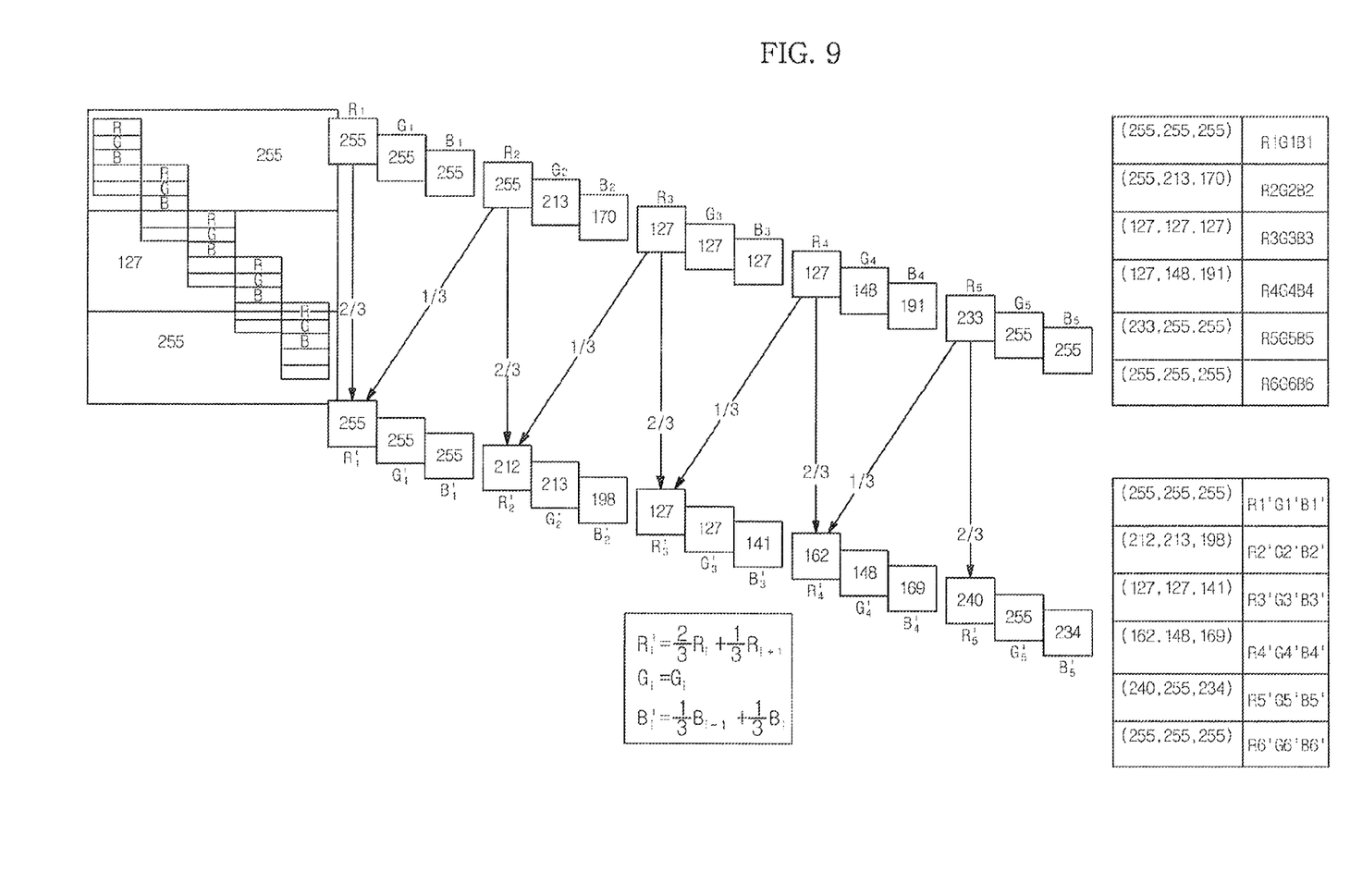
FIG. 9 is a diagram describing a method of reducing a color shift of an image in the image processing apparatus according to an embodiment of the present disclosure.
Figure 10:
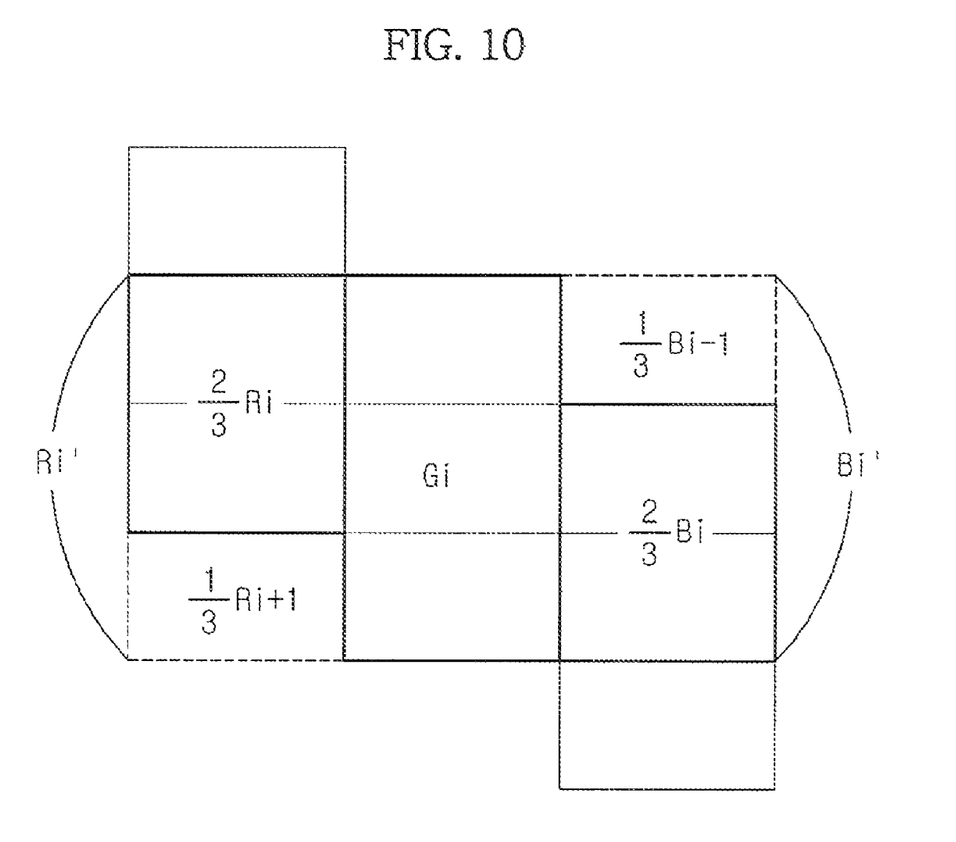
FIG. 10 is a diagram describing a method of interpolating an image signal in the image processing apparatus according to an embodiment of the present disclosure.

FIG. 9 is a diagram describing a method of reducing a color shift of an image in the image processing apparatus according to an embodiment of the present disclosure. FIG. 10 is a diagram describing a method of interpolating an image signal in the image processing apparatus according to an embodiment of the present disclosure.

Referring to FIGS. 9 and 10, the strength of colors associated with a document can be represented digitally by, for example, a range from 0 to 255 with an 8-bit binary number. When the original document includes a region having a gray color with RGB values of (127, 127, 127) and having a width of 2.1.7 pixels, and that region is painted on a white background having RGB values of (255, 255, 255), reading and printing the original document can result in a color line scanned over four pixels. That is, even for gray color, a color of 1 or 2 pixels may be output, with the upper edge of the line being reddish and the lower edge of the line being bluish, thereby generating color fringes. In addition, a whole line having a width smaller than a width of 5/3=1.7 pixels can be represented by a color without a gray scale.

To address such occurrences, the image processor 60 can interpolate the red color into the lower side of the green color by a 1/3 pixel and the blue color into the upper side of the green color by a 1/3 pixel using the green color as a reference color with respect to the image signals stored in the memory 50. That is, when the green color is used as the reference color, two lines can be stored in the vertical direction with respect to the red color and the blue color, interpolation ratios of colors can be determined by Equation 1 below, and the color signals of the colors can be interpolated according to the determined interpolation, ratios to generate new color signals. The new color signals generated in this manner can be used for the output of the image.

$$R(i)' = 2/3 \times R(i) + 1/3 \times R(i+1),$$

$$G(i)' = G(i), \text{ and}$$

$$B(i)' = 1/3 \times B(i-1) + 2/3 \times B(i), \text{ where } i \text{ is a line index value.} \quad \text{Equation 1}$$

FIG. 9 shows the RGB values before interpolation, $R_1G_1B_1$ to $R_6G_6B_6$, and the corresponding RGB values after interpolation, $R_1'G_1'B_1'$ to $R_6'G_6'B_6'$. From these results, it can be seen that the color fringe phenomenon after interpolation is improved when compared to the color fringe phenomenon before interpolation.

As described above, when the original document is read using the CIS module 20 that has a single channel line sensor and RGB light sources, to implement the RGB colors, each of the RGB LEDs can be sequentially turned ON during 1/3 of an exposure time of one line to scan the colors. As a result, a registration error of a 1/3 pixel can occur between R-G and G-B and a color shift can occur in the image. For example, the red color can be interpolated into the lower side of the green color by a 1/3 pixel and the blue color can be interpolated into the upper side of the green color by a 1/3 pixel when the green color is used as the reference color.

While in the above-described embodiment the green color is being used as the reference color, other embodiments of the present disclosure need not be so limited. Any one of the red color and the blue color can also be used as the reference color.

For example, when the red color is set as the reference color, the interpolation ratios of the colors can be determined by Equation 2 described below, and the color signals of the colors can be interpolated according to the interpolation ratios determined using Equation 2.

$$R(i)' = R(i),$$

$$G(i)' = 2/3 \times G(i) + 1/3 \times G(i-1), \text{ and}$$

$$B(i)' = 1/3 \times B(i) + 2/3 \times B(i-1), \text{ where } i \text{ is a line index value.} \quad \text{Equation 2}$$

When the blue color is used as the reference color, the interpolation can be performed using an approach that is substantially similar as the above-described approaches.

The existing color signals can be converted into new color signals by the above-described interpolation methods. The image can be output based on the converted new color signals.

While in the above-described embodiment the interpolation is being performed based on the current line of the reference color, other embodiments of the present disclosure need not be so limited. For example, an alternative interpolation approach can be based on determining a virtual intermediate line between the current line and a previous line and using the values of the virtual intermediate line when outputting the image.

Figure 11:
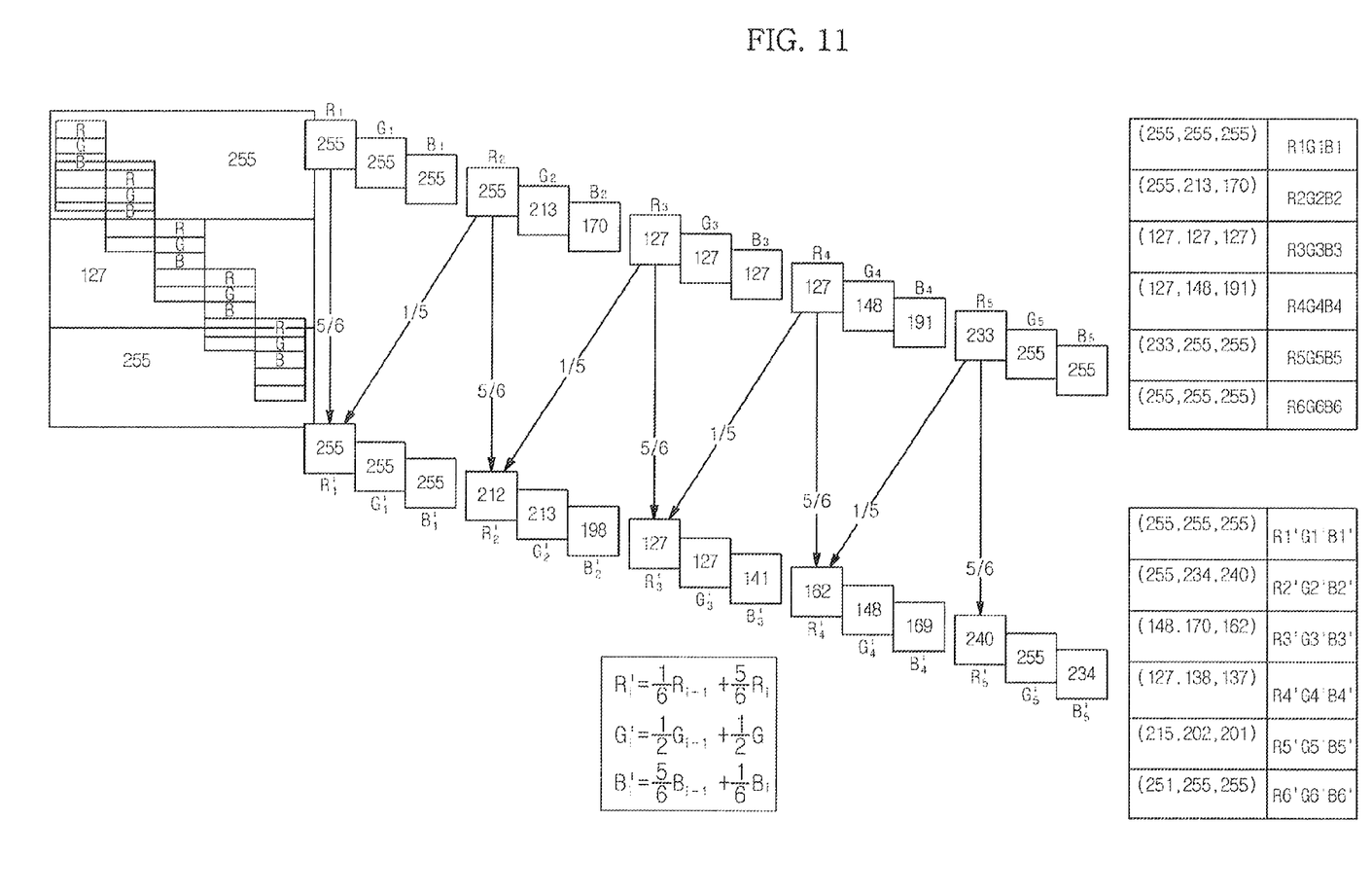
FIG. 11 is a diagram describing a method of interpolating an image signal in an image processing apparatus according to another embodiment of the present disclosure.

FIG. 11 is a diagram describing a method of interpolating an image signal in an image processing apparatus according to another embodiment of the present disclosure. Referring to FIG. 11, the interpolation of the image signal can be performed on the basis of the virtual intermediate line between the previous line and the current line, instead of basing the interpolation on the current line of the reference color.

For example, the green color can be used as the reference color, and the interpolation of the RGB colors based on the virtual intermediate line between the previous line i−1 and the current line i can be performed by determining interpolation ratios of the colors by Equation 3 described below and interpolating the color signals of the colors according to the interpolation ratios determined using Equation 3.

$$R(i)' = 1/6 \times R(i-1) + 5/6 \times R(i);$$

$$G(i)' = 1/2 \times G(i-1) + 1/2 \times G(i);$$

$$B(i)' = 5/6 \times B(i-1) + 1/6 \times B(i), \text{ where } i \text{ is a line index value.} \quad \text{Equation 3}$$

While in the above-described embodiment the green color is being used as the reference color, other embodiments of the present disclosure need, not be so limited, and any one of the red color and the blue color can be set as the reference color. When the red color or the blue color is used as the reference color, the interpolation equation can be obtained by substantially the same approach as the above-described approach.

The interpolation methods of the image signal using Equations 1 to 3 above can reduce the color shift of the image. The edges of the image, however, can be blurred and the boundary thereof may not be clearly distinguished. Accordingly, the image signal can be interpolated by a method that extends the reference color over three lines to prevent or reduce such blurring.

An interpolation method that addressed the blurring in the image can be performed by Equation 4:

$$R(i)' = 3/10 \times R(i-1) + 7/10 \times R(i),$$

$$G(i)' = 1/6 \times G(i-1) + 4/6 \times G(i) + 1/6 \times G(i+1), \text{ and}$$

$$B(i)' = 7/10 \times B(i) + 3/10 \times B(i+1), \text{ where } i \text{ is a line index value.}$$

While several embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An image processing apparatus, comprising:
   a sensor module having a light source and an optical sensor, the light source being configured to generate a plurality of lights each of a color different than, and being temporally offset from, other ones of the plurality of lights, the optical sensor being a single channel line sensor and being configured to produce color signals associated with the plurality of lights reflected from a document;
   a memory configured to store data associated with the color signals produced by the optical sensor, the data associated with the color signals being stored in units of lines; and
   an image processor configured to determine interpolation ratios of the color signals associated with a current line of data stored in the memory based on a reference color and based on at least one other line of data stored in the memory, the image processor being further configured to generate a new color signal associated with the current line based on the determined interpolation ratios,
   wherein the plurality of lights each of a different color include red (R), green (G) and blue (B),
   wherein the reference color is any one of R, G and B, and
   wherein the image processor determines the interpolation ratios of the new color signals R(i)', G(i)' and B(i)' by the following equation:

$$R(i)' = 3/10 * R(i-1) + 7/10 * R(i),$$

$$G(i)' = 1/6 * G(i-1) + 4/6 * G(i) + 1/6 * G(i+1), \text{ and}$$

$$B(i)' = 7/10 * B(i) + 3/10 * B(i+1), i \text{ being a current line index value.}$$

2. A method of controlling an image processing apparatus including a sensor module having a single channel line sensor and a light source configured to produce a plurality of temporally offset lights of different colors, the method comprising:
   scanning a document with the sensor module to produce color signals associated with the scanned document;
   storing data associated with the color signals;
   determining interpolation ratios for color signals associated with a current line of stored data based on a reference color and based on color signals associated with at least one other line of stored data; and
   generating new color signals associated with the current line based on the determined interpolation ratios,
   wherein the plurality of lights includes a light for each of red (R) color, green (G) color and blue (B) color,
   wherein any one of the R color, the G color and the B color is the reference color on which the determined interpolation ratios are based, and
   wherein the interpolation ratios of the new color signals R(i)', G(i)' and B(i)' are determined by the following equation:

$$R(i)' = 3/10 * R(i-1) + 7/10 * R(i),$$

$$G(i)' = 1/6 * G(i-1) + 4/6 * G(i) + 1/6 * G(i+1), \text{ and}$$

$$B(i)' = 7/10 * (i) + 3/10 * B(i+1), i \text{ being a current line index value.}$$

3. An apparatus for acquiring an image from a document by exposing the document sequentially with at least a first light of a first color and a second light of second color different from the first color, and by receiving at a single channel line sensor the first and second lights reflected off the document with a temporal offset there between, the single channel line sensor having an array of optical sensors arranged in a line along a main scanning direction, the optical sensors being configured to output color signals in response to receipt of each of the reflected first and second lights, the apparatus comprising:

a memory configured to store data associated with lines of color signals produced by the optical sensors, each line of color signals representing color signals contemporaneously output by the optical sensors; and a processor configured to determine new color signals associated with a current line of at least one color associated with the at least first and second lights based on a reference color and based on the data associated with the current and at least one other line of color signals, the new color signals compensating for the temporal offset between the at least first and second lights, wherein the at least first and second lights comprises red (R), green (G) and blue (B) lights, wherein the reference color is any one of R, G and B, and wherein the processor determines the new color signals R(i)', G(i)' and B(i)' according to the following equation:

$R(i)'=3/10*R(i-1)+7/10*R(i)$, $G(i)'=1/6*G(i-1)+4/6*G(i)+[1/6]*G(i+1)$, and $B(i)'=7/10*B(i)+3/10*B(i+1)$, $i$ being a current line index value.

* * * * *